(12) United States Patent
Sethuramalingam et al.

(10) Patent No.: US 9,652,281 B2
(45) Date of Patent: *May 16, 2017

(54) SYSTEM AND METHOD FOR VIRTUALIZATION AWARE SERVER MAINTENANCE MODE

(71) Applicant: Dell Products L.P., Round Rock, TX (US)

(72) Inventors: Karthik Sethuramalingam, Bangalore (IN); Rajashekhar T. Hamasagar, Bangalore (IN); Sridhar Chakravarthy, Bangalore (IN); Eric Kuzmack, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/151,636

(22) Filed: May 11, 2016

(65) Prior Publication Data

US 2016/0253203 A1 Sep. 1, 2016

Related U.S. Application Data

(63) Continuation of application No. 13/778,121, filed on Feb. 27, 2013, now Pat. No. 9,384,021.

(51) Int. Cl.
  *G06F 15/16* (2006.01)
  *G06F 13/28* (2006.01)
  (Continued)

(52) U.S. Cl.
  CPC ............ *G06F 9/45558* (2013.01); *G06F 8/65* (2013.01); *G06F 9/45533* (2013.01)

(58) Field of Classification Search
  CPC ............... H04L 29/08072; H04L 29/06; H04L 29/0809; H04L 29/08981; G06Q 30/02;
  (Continued)

(56) References Cited

U.S. PATENT DOCUMENTS

| | | | | |
|---|---|---|---|---|
| 2004/0215985 | A1* | 10/2004 | Armstrong | ............ G06F 1/3203 713/300 |
| 2012/0005404 | A1* | 1/2012 | Raz | ........................ G06F 3/0617 711/103 |

OTHER PUBLICATIONS

Hass, Jon, et al., "Dell Lifecycle Controller Remote Services Overview," A Dell Technical White Paper, Dell Product Group; 9 pages, Aug. 2009.

* cited by examiner

*Primary Examiner* — Mahran Abu Roumi
(74) *Attorney, Agent, or Firm* — Baker Botts L.L.P.

(57) ABSTRACT

In accordance with the present disclosure, a system and method are herein disclosed for providing a virtualization aware server maintenance mode. In one embodiment, an event is triggered in when a system action request is received by an information handling system. The event is processed and the hypervisor is placed in maintenance mode. The virtualization manager is notified that the mode of the hypervisor has changed and the virtualization manager stores the information associated with the mode status change. The virtualization manager may also notify other remote access consoles or virtualization managers of the mode status change of the hypervisor. A maintenance mode lock may be acquired when the hypervisor is placed in maintenance mode and released after the system action has been processed.

17 Claims, 5 Drawing Sheets

(51) Int. Cl.
*G06F 1/00* (2006.01)
*G06F 9/455* (2006.01)
*G06F 9/445* (2006.01)

(58) Field of Classification Search
CPC ............... G06F 12/0246; G06F 3/0679; G06F 2212/2022; G06F 2212/7211; G06F 1/3203; G06F 1/26; G06F 1/3296; G11C 16/102; Y02B 60/1217; Y02B 60/1285
USPC .......................................................... 709/217
See application file for complete search history.

SYSTEM AND METHOD FOR VIRTUALIZATION AWARE SERVER MAINTENANCE MODE

CROSS-REFERENCE TO RELATED APPLICATION

This application is a continuation of application Ser. No. 13/778,121 titled "System and Method for Virtualization Aware Server Maintenance Mode," filed Feb. 27, 2013, which is incorporated herein by reference.

TECHNICAL FIELD

The present disclosure relates generally to remote computing systems and information handling systems, and, more particularly, to a system and method for providing virtualization aware server maintenance mode.

BACKGROUND

As the value and use of information continues to increase, individuals and businesses seek additional ways to not only process and store information locally and remotely but also to provide efficient and cost-effective maintenance and upgrades for systems that process and store information both locally and remotely (in a cloud). One option available to these users is an information handling system. An information handling system generally processes, compiles, stores, and/or communicates information or data for business, personal, or other purposes thereby allowing users to take advantage of the value of the information. Information handling systems may reside local to a particular area or may reside in a remote or virtual space and communicate to other information handling systems and devices through a network path. An information handling system may also operate as a virtual machine, as a host machine, or a combination of a virtual machine and a host machine. An information handling system may also operate as multiple virtual and host machines in any combination known to one of ordinary skill in the art. To take advantage of the value of the information, information handling systems also must allow for efficient and cost-effective maintenance operations and upgrades. Because technology and information handling needs and requirements vary between different users or applications, information handling systems may vary with respect to the type of information handled; the methods for handling the information; the methods for processing, storing or communicating the information; the amount of information processed, stored, or communicated; the speed and efficiency with which the information is processed, stored, or communicated; and the efficiency and cost-effectiveness of providing maintenance operations and upgrades. The variations in information handling systems allow for information handling systems to be general or configured for a specific user or specific use such as financial transaction processing, airline reservations, enterprise data storage, or global communications. In addition, information handling systems may include or comprise a variety of hardware and software components that may be configured to process, store, and communicate information and may include one or more computer systems, data storage systems, and networking systems. Such information handling systems may be servers, laptop computers, desktop computers, or any other type of electronic device capable of storing and retrieving data.

An information handling system will typically include some type of temporary information storage medium, such as random access memory (RAM). The amount of memory included in an information handling system may be on the order of gigabytes or may be greater or smaller depending on the operational requirements of the information handling system. As memory size increases, the likelihood that part of the memory will either be manufactured defective or become defective over time increases. If left unmanaged, the presence of defective memory cells, regardless of their size, can cause the information handling system to fail. Such failure can initiate an abrupt end to the current operation of the information handling system, resulting in the loss of critical data. A memory failure could also prevent the information handling system from starting up or booting up altogether.

As information handling systems continue to evolve and computer technology advances, the operational relationship between the CPU and memory becomes more significant and complex. Many attributes of modern systems (specifically, the introduction of multi-core processors and virtualization) are contributing to an ever-larger memory footprint within a typical information handling system. Consequently, not only is system memory becoming a much more substantial percentage of the overall cost of the information handling solution, the impact of erroneous behavior in the memory can have a much more adverse effect on the life cycle expense associated with the information handling system.

An information handling system may include one or more operating systems. An operating system serves many functions, such as controlling access to hardware resources and controlling the execution of application software. Operating systems also provide resources and services to support application software. These resources and services may include a file system, a centralized configuration database (such as the registry found in Microsoft Windows operating systems), a directory service, a graphical user interface, a networking stack, device drivers, and device management software. In some instances, services may be provided by other application software running on the information handling system, such as a database server.

Some information handling systems are designed to interact with other information handling systems over a network connection. In some instances, the information handling systems may act as servers, while others act as clients. In such systems, client applications and client devices may be designed so that the majority of the heavily used resources are at a shared information handling system, such as a centralized server or servers. The client devices may have minimal memory, disk storage, and processor power. Use of such client devices may reduce the total cost of ownership because of the reduced use of resources at the client devices and because the clients can be centrally administered and updated from the server. Such client devices may be particularly well-suited for a network which can handle a significant number of client devices.

Some information handling systems may be operable to be placed in different modes. For example, some information handling systems may be placed in a maintenance mode that permits a maintenance operation or an upgrade, for example, a firmware update, to be performed on the information handling system without unexpectedly corrupting, overwriting or losing data. Information handling systems may be configured as servers that include multiple management consoles for managing different silos. Prior solutions for performing maintenance operations require storing the maintenance mode in the management station or storing information locally. Such prior solutions permit only the users of a particular management station to know the state change or the maintenance activity of the local management station. Other management consoles have no way to obtain information or knowledge about the maintenance operation being performed on a given information handling system without manually synchronizing the information to all necessary systems. Using this approach to performing a maintenance operation, leaves synchronization to individuals, which can lead to human error. Also, because individuals perform synchronization on individual systems, the maintenance operations must be triggered manually at each console resulting in possibly longer than expected periods of downtime or inoperability.

SUMMARY

In accordance with the present disclosure, a system and method are herein disclosed for providing a virtualization aware server maintenance mode. In an information handling system, maintenance operations must be performed to keep the information handling system up-to-date, compatible with other information handling systems, and functioning properly. A virtualization manager aware of the occurrence of a server entering maintenance mode provides greater utility and efficiency in the management of local, remote and virtual information handling systems.

The system and method disclosed herein are technically advantageous because a mechanism is provided for eliminating the problems and disadvantages associated with performing maintenance operations on an information handling system. In particular, the present disclosure provides a way for an information handling system to synchronize the performance of and distribution of information related to maintenance operations. Further, the present disclosure provides for the accessibility of maintenance activity at a particular information handling system by users of different management stations. By providing a virtualization aware server maintenance mode, the virtualization manager is informed automatically or within a specified timeframe about the server maintenance which results in less or no downtime or loss to SLA. Unlike existing systems that require a manual interaction, overall system costs for the information handling system are correspondingly reduced as no new protocol is required for managing maintenance operations. Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
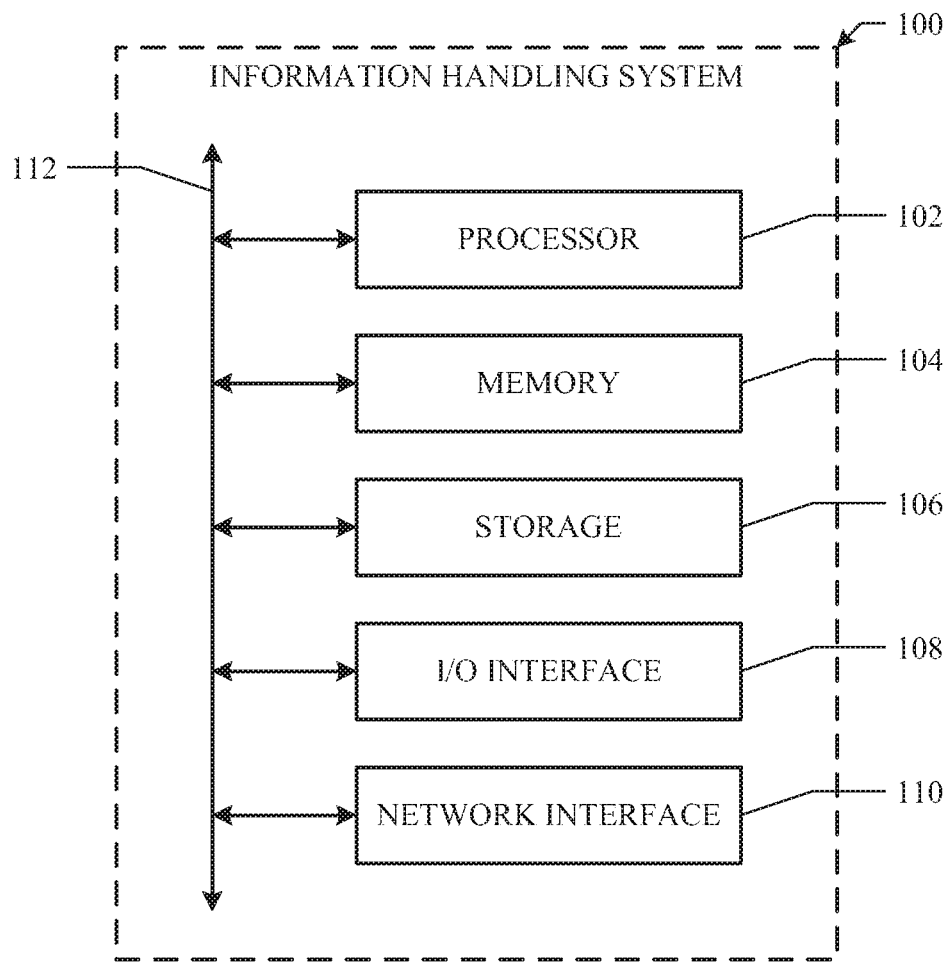
FIG. 1 illustrates an example information handling system.

This disclosure generally relates to configuration of information handling systems and, in particular, relates to the management of maintenance operations of an information handling system by performing system actions, such as system actions that place the information handling system in maintenance mode and that inform the virtualization manager about the system action or maintenance operation. The system and method involve an information handling system that allows for a virtualization aware server maintenance mode.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), system management RAM (SM-RAM), one or more processing resources such as a central processing unit (CPU) or hardware or software control logic, ROM, and/or other types of nonvolatile memory. Additional components of the information handling system may include an interface to a virtual machine manager, an interface to a web console, an interface to a management console, a remote access controller, a hypervisor, one or more disk drives, one or more network ports for communication with external devices as well as various input and output (I/O) devices, such as a keyboard, a mouse, and a video display. The information handling system may also include one or more buses operable to transmit communications between the various hardware components.

For the purposes of this disclosure, computer-readable storage media may include any instrumentality or aggregation of instrumentalities that may retain data and/or instructions for a period of time. Computer-readable storage media may include, for example, without limitation, storage media such as a direct access storage device (e.g., a hard disk drive or floppy disk), a sequential access storage device (e.g., a tape disk drive), compact disk, CD-ROM, DVD, RAM, ROM, electrically erasable programmable read-only memory (EEPROM), and/or flash memory.

A "local" device of an information handling system, or a device "locally" connected to a system, may be a device directly connected to the system using one or more wires, connecters, or buses (for example, physically connected to the system), a device indirectly connected to the system using one or more hubs or other connectivity devices, a device directly connected to the system using a wireless link, or other connections known to one of ordinary skill in the art. Furthermore, in one aspect of the present disclosure, a local device of a system or a device locally connected to a system may include a device within the system (for example, an internal device).

The present disclosure is now described in detail with reference to a few embodiments thereof illustrated in the accompanying drawings. In the following description, numerous specific details are set forth in order to provide a thorough understanding of the present disclosure. However, the present disclosure may be practiced without some or all of these specific details. In other instances, well known process steps and/or structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

In systems based on the server/client model, certain resources may be shared amongst clients or between clients and servers via a network. In some cases, it may be advantageous to make peripheral devices connected locally at one client device available to one or more information handling systems on the network. Where one client and one server is depicted or referenced, any number of clients and servers may be connected to the network.

Some devices that may be locally connected to a client device are composite devices having one or more interfaces and possibly one or more functions. Also, where one client device is depicted or referenced, any number of client devices may be present.

Shown in FIG. 1 is a block diagram of an example information handling system 100. Information handling system 100 may be a personal computer system or an enterprise computer system, or may be configured and used for any purpose known to one of ordinary skill in the art. In one or more embodiments, information handling system 100 may perform one or more steps of one or more methods described or illustrated herein or provide functionality described or illustrated in this disclosure. In other embodiments, software running on one or more information handling system 100 performs one or more steps of one or more methods described or illustrated herein or provides functionality described or illustrated herein. Particular embodiments include one or more components of one or more information handling systems 100.

While FIG. 1 illustrates an example information handling system 100, this disclosure contemplates any number of information handling systems 100 connected to form a system suitable for a given operation or functionality as known to one of ordinary skill in the art. As an example, and not by way of limitation, information handling system 100 may be an embedded computer system, a desktop computer system, a laptop or notebook computer system, an interactive kiosk, a mainframe, a server, or any other computing device known to one of ordinary skill in the art. The information handling system 100 may also include one or more of any of the aforementioned devices. Where appropriate, information handling system 100 may include one or more information handling systems 100; be unitary or distributed; span multiple locations; span multiple machines; or reside in a cloud, which may include one or more cloud components in one or more networks and may include one or more client/server devices. Where appropriate, one or more information handling systems 100 may perform without substantial spatial or temporal limitation one or more steps of one or more methods described or illustrated herein. As an example, one or more steps of one or more methods described or illustrated herein may be performed by information handling system 100 at different times or at different locations where appropriate.

In one or more embodiments, information handling system 100 includes a processor 102, memory 104, storage 106, an input/output (I/O) interface 108, a network interface 110, and a bus(es) 112. Although this disclosure describes and illustrates a particular information handling system 100 having a particular set of particular components in a particular arrangement, this disclosure contemplates any suitable information handling system having any suitable combination and arrangement of components as known to one of ordinary skill in the art.

In an example embodiment, processor 102 may include hardware and software components for the structure and operation of the process steps and system disclosed. While not specifically shown, it should be understood that any number of program modules comprising computer-readable instructions may be stored in the information handling system storage 106 or other memory and may be executed by processor 102. Storage 106 or memory 104 or other such memory may be a hard disk, magnetic disk, optical disk, ROM, RAM or any other computer media known to one of ordinary skill in the art for the storage and retrieval of data, including executable or computer-readable instructions. Upon execution of the computer-readable instructions, certain actions may be performed as described in this disclosure.

In another embodiment, memory 104 includes main memory for storing instructions for processor 102 to execute or data for processor 102 to operate on. As an example, information handling system 100 may load instructions for execution from storage 106 or another source (such as, for example, another information handlings system 100, an external memory source, a remote memory source, or any other memory source known to one of ordinary skill in the art) to memory 104. Bus 112 may included one or more buses for connecting processor 102, memory 104, storage 106, I/O interface 108 and network interface 110.

In another embodiment, I/O interface 108 includes hardware, software, or both providing one or more interfaces for communication between information handling system 100 and one or more I/O devices. Information handling system 100 may include one or more I/O devices, where appropriate. One or more of these I/O devices may enable communication between an individual or other software and information handling system 100. As an example, an I/O device may include a keyboard, keypad, microphone, monitor, mouse, or any other I/O device known to one of ordinary skill in the art or a combination of two or more I/O devices. For example, the I/O device may allow an individual or other software to alter the mode of operation, for example, the maintenance mode, of information handling system 100 or to alter certain management, maintenance, or other system variables, including, for example, altering variables to update or upgrade firmware, hardware, software or any combination thereof. I/O interface 108 may include one or more device or software drivers enabling processor 102 to drive one or more of these I/O devices. I/O interface 108 may include one or more I/O interfaces 108, where appropriate. Although this disclosure describes and illustrates a particular I/O interface, the disclosure contemplates any suitable I/O interface.

In an example embodiment, network interface 110 includes firmware, hardware, software, or any combination thereof for providing one or more interfaces for communication (for example, packet-based communication) between information handling system 100 and one or more other information handling system 100 on one or more networks. For example, network interface 110 may include a network interface controller (NIC) or network adapter for communicating with a telephone network, an Ethernet or other wire-based network or a wireless NIC (WNIC) or wireless adapter for communicating with a wireless network, such as a WI-FI network, or any other network interface for communicating with any type of network known to one of ordinary skill in the art.

In an example embodiment, bus 112 includes hardware, software, or both which couples components of information handling system 100 to each other. Bus 112 may include one or more buses where appropriate and may communicatively, physically, virtually, or otherwise as required couple the components of information handling system 100 to each other.

Figure 2:
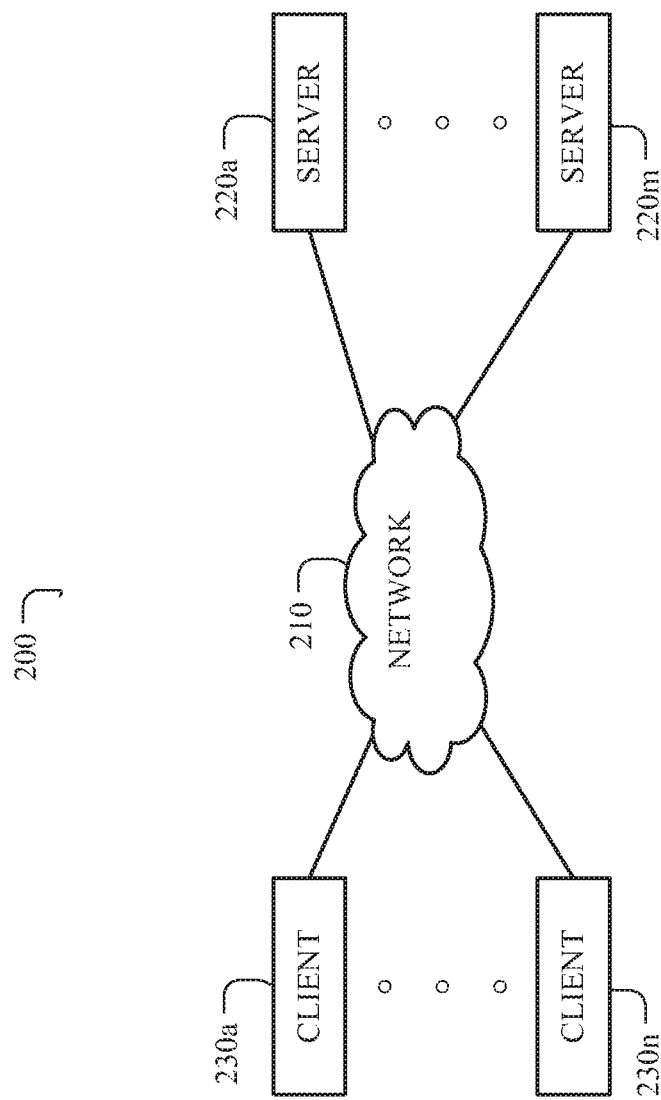
FIG. 2 illustrates an example configuration of networked information handling systems.

FIG. 2 illustrates an example configuration of a networked information handling system 200. It should be apparent that information handling system 200 may include any one or more of the depicted components and that information handling system may refer to an individual information handling system or to a system 200 as a whole. In one embodiment, one or more client devices 230a-230n (where n equals the number of client devices) and one or more servers 220a-220m (where m equals the number of servers) are connected via network 210. In some embodiments, it should be understood that only one server 230a is connected to network 210 while in other embodiments any number of servers 230a-n are connected to network 210. Likewise, in some embodiments, it should be understood that only one client device 230a is connected to network 210 while in other embodiments any number of client devices 230a-n are connected to network 210. Any number, including different types, of peripheral devices may be connected locally to the client devices 230a-230n. As described with FIG. 1, any number of I/O devices may be connected to client devices 230a-230n. In an example embodiment, one or more I/O interfaces 108 of client devices 230a-230n may appear to one or more servers 220a-220m as if they are locally installed on and connected to those servers 220a-220m, while other interfaces associated with other I/O devices on one or more client devices 230a-230n may be redirected such that they appear to be locally installed or remotely shared with other client devices 230a-230n or servers 220a-220m.

FIG. 2 illustrates an example embodiment for a configuration of networked information handling systems 200. In particular, one or more client devices 230a-203n connect to one or more servers 220a-220m via network 210. Client devices 230a-230n may connect to only one of the servers 220a-220m or may connect via network 210 to multiple servers 220a-220m. Client devices 230a-230n may each connect via network 210 to a unique server from the group of servers 220-220m. In one example embodiment, client device 230a may connect via client device 230b (not shown) via network 210 to server 220a. In another embodiment, server 220a may connect to server 220b (not shown) and not connect to network 210. In such an example, server 220a may not connect to any client devices 230a-230n or may connect via server 220b (not shown) via network 210 to any one or more of client devices 230a-230n. It should be apparent that client devices 230a-230n may connect via network 210 to servers 220a-220m in any number of configurations and via any number of types of network connections as known to one of ordinary skill in the art. It should also be apparent that client devices 230a-230n may connect to each other in any number of configurations and that servers 220a-220m may connect to each other in any number of configurations known to one of ordinary skill in the art.

Figure 3:
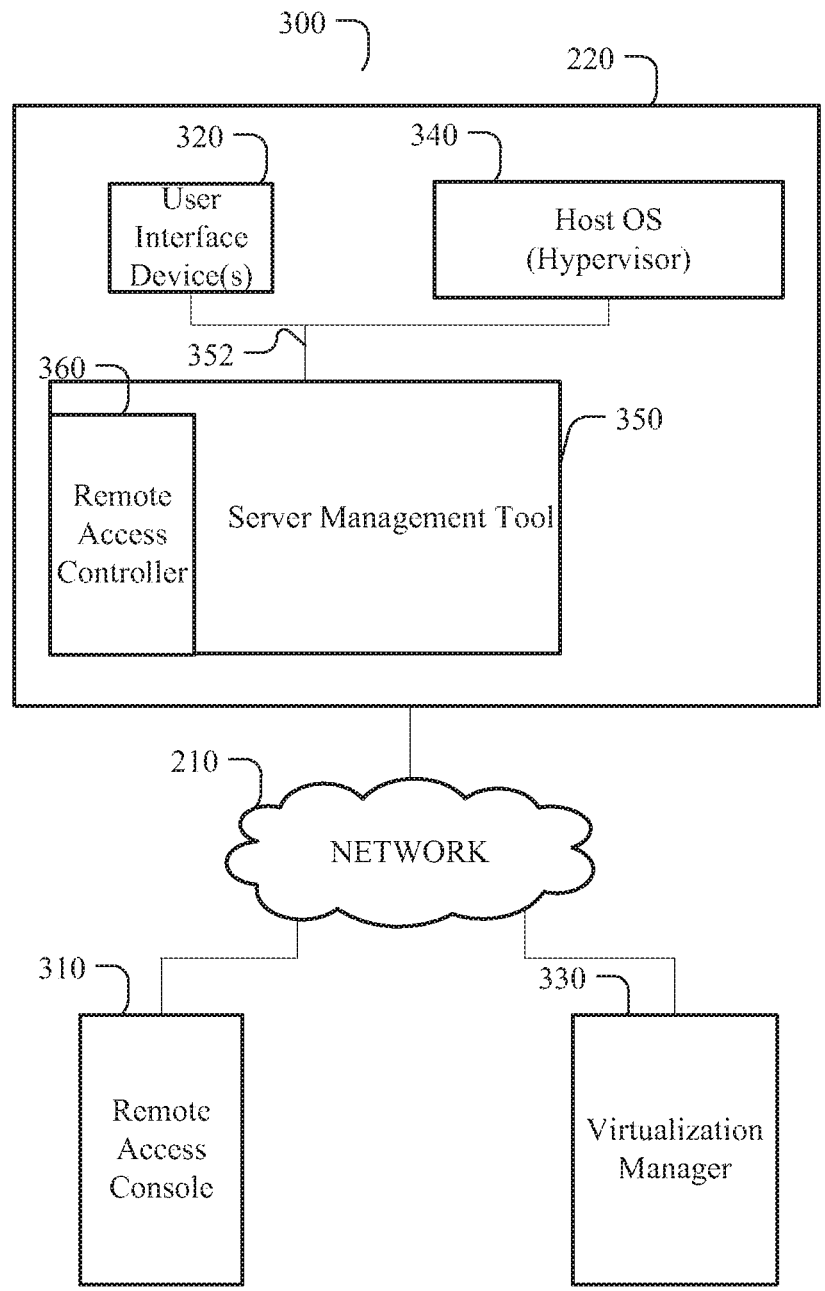
FIG. 3 illustrates another example of an information handling system of networked client and server that allows for a virtualization aware server maintenance mode.

FIG. 3 illustrates an example embodiment of a networked client and server configuration that allows for implementation of a virtualization aware server maintenance mode. Server 220 comprises one or more components for managing updates and upgrades and other tasks associated with system actions, such as instrumentation, configuration, and utilization of server components including, for example, user interface device(s) 320, hypervisor 340, server management tool 350, and remote access controller 360. While not depicted, it should be readily apparent that server 220 may also comprise other components necessary to accomplish the tasks in this disclosure. In one example embodiment, the hypervisor 340 or virtual machine manager (VMM) comprises computer software, firmware, hardware, or any combination thereof to create and run one or more virtual machines. For example, server 220 may be a host system, for example, information handling system 100, that runs hypervisor 340 where hypervisor 340 is running one or more virtual systems (or guest systems). Example hypervisors include Microsoft Hyper-V, VMware Workstation, VirtualBox, and other hypervisors known to one of ordinary skill in the art for operation on operating systems, for example, Linux or Microsoft Windows. In one example embodiment, hypervisor 340 is operable to be placed in one or more modes or states of operation, for example, maintenance mode. In maintenance mode, for example, the hypervisor is not running or accepting requests and may be configured or altered.

In one example embodiment, the server 220 comprises a server management tool (or embedded management controller) 350 coupled to the hypervisor 340 via one or more bus(es) 352. Bus(es) 352 may be, for example, an Intelligent Platform Management Interface (IPMI) standard interface utilized in servers for communication between a hypervisor and a server management tool. In one example embodiment, server management tool 350 is a Dell Lifecycle Controller (LCC) and may be any other one or more known management tools. The server management tool 350 comprises computer software, firmware, hardware, or any combination thereof for providing server management and provides an interface for and manages, for example, provisioning of operating system configuration, deployment of operating system including drivers, firmware updates, servicing/maintenance configuration of components, user customization of data collection/logs of server 220 where the interface can be a remote interface or a local interface, such as user interface device(s) 320. The server management tool 350 may comprise a special purpose processor such as remote access controller 360. Server management tool 350 and remote access controller 360 may be a single component, multiple components communicatively coupled within a single dye, or multiple components coupled via bus(es) (not shown). One example remote access controller 360 is the Dell iDRAC (integrated Dell Remote Access Controller) which also includes UEFI (Unified Extensible Firmware Infrastructure) system firmware and which is integrated into the Dell LCC. The remote access controller 360 comprises computer software, firmware, hardware, or any combination thereof for providing remote access management and may be operable to access and manage different aspects of the server 220 hardware, including component and subsystem management that are not within the management capabilities of the traditional server Baseboard Management Controller (BMC).

Server management tool 350 and remote access controller 360 may be coupled via bus(es) 352 to one or more user interface device(s) 320. The user interface device(s) 320 may include a display, keyboard, keypad, microphone, monitor, mouse, or any other known to one of ordinary skill in the art I/O device or a combination of two or more I/O devices for providing a user interface. For example, an LCD panel menu and a keyboard/keypad may be used to input commands locally to the remote access controller 360 that place the information handling system 220 in maintenance mode.

In one example embodiment, server 220 is connected to one or more management consoles via network 210. Virtualization manager 330 may manage hypervisor 340 of server 220. In one example embodiment, virtualization manager 330 may comprise a Microsoft Windows System Center Virtual Machine Manager (SCVMM) or a VMWare vCenter or any other known system management consoles. Virtualization Manager 330 may be operable to send system action requests via network 210 to remote access controller 360 that, for example, place the information handling system 220 in maintenance mode.

In one example embodiment, another console connected via network 210 to server 220 may be a remote access console 310 such as a Dell OpenManage Essentials (OME) or Dell IT Assistant (ITA) systems management console which provide basic Dell hardware management or any other known remote access consoles. While only one remote access console 310 is depicted, any number of remote access consoles 310 may be used according to the configuration of a specific information handling system. Remote access console 310 may be, for example, any one or more of a web console such as a Dell iDRAC Web Console or a command line interface, or any other remote interface known to one of ordinary skill in the art. Remote access console 310 may be operable to send system action requests via network 210 to remote access controller 360 that, for example, place the information handling system 220 in maintenance mode.

Figure 4:
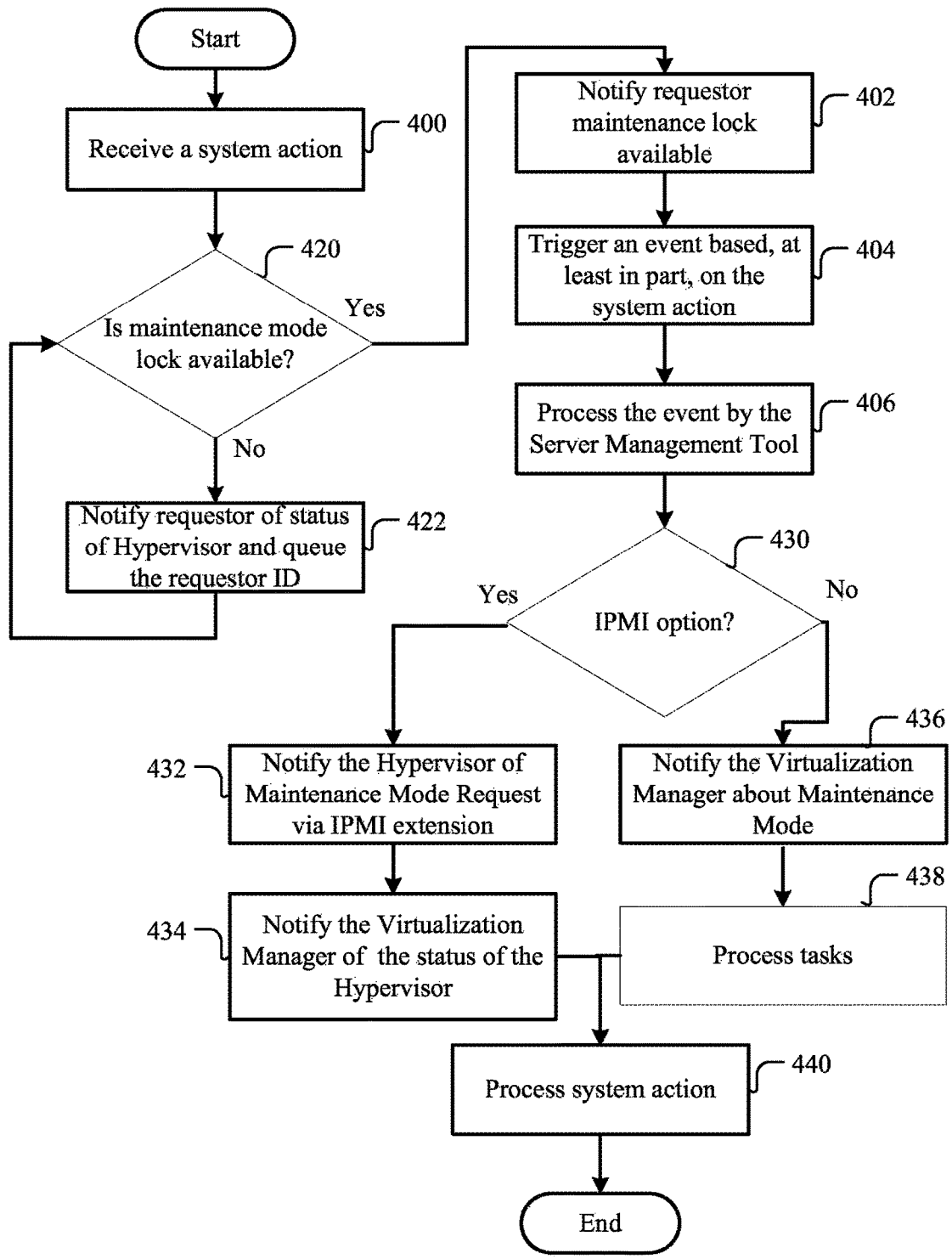
FIG. 4 illustrates a flow diagram of a method for providing virtualization aware server maintenance mode.

Referring now to FIG. 4, illustrated is a flow diagram of a method for providing virtualization aware server maintenance mode in an information handling system, such as information handling system or server 220. At step 400 a system action is received. In one example embodiment, multiple system actions are received, for example, by server 220, with each being placed in a queue. The multiple system actions may be queued based on several criteria, including, but not limited to, length of time to perform the system action, type of system action, timestamp of receipt of the system action, priority assigned to the system action, and any other criteria known to one of ordinary skill in the art.

The system action of step 400 may be requested by software, firmware, hardware, or any combination thereof. For example, in one embodiment, a system action may be requested by a software application and may be requested upon occurrence of a specific event. In another embodiment, a system action may be requested by hardware, for example, in association with a timer. In one embodiment, a system action may be received by a general purpose processor of the information handling system, for example, processor 102 of information handling system 100. The system action may be requested locally or remotely. For example, the system action may be sent from any one or more of the remote access console 310, virtualization manager 330, user interface device(s) 320, or remote access controller 360. User interface device(s) 320 may be used locally to request a system action, for example, a local LCD may be utilized to request a system action. Similarly, user interface devices may be used from any one or more remote locations, for example, at remote access console 310 or virtualization manager 330, to request that a system action be performed at information handling system 100. While it is contemplated that a system action may require an information handling system to be placed in specific modes, for purposes of this disclosure, the system action is an action that requires that the information handling system be placed in maintenance mode.

At step 420, upon receiving a system action, the availability of a maintenance lock for a hypervisor associated with the requestor of the system action is determined. The requestor may be any one or more of virtualization manager 330, remote access console 310, remote access controller 360, user interface device(s) 310, or any other device known to one of ordinary skill in the art. If a maintenance lock is not available, then the requestor is informed of the status of the hypervisor and the requestor ID is queued at step 422. For example, if a system action is received while the hypervisor is already in maintenance mode, a notification may be sent to the requestor that informs the requestor of the status of the hypervisor or that a maintenance lock is not currently available.

A maintenance mode lock may be acquired where the maintenance mode lock is associated with one or more attributes of the maintenance mode of an associated hypervisor 340. The maintenance mode lock may be maintained until processing of the system action (Step 440 described below) has been completed. In one example embodiment, any one or more of virtualization manager 330, remote access controller 310, and user interface device(s) 320 associated with hypervisor 340 associated with any of the queued system actions are notified each time a maintenance mode lock is acquired for hypervisor 340 and each time the maintenance mode lock is released. The maintenance mode lock may be released after processing of the system action (see FIG. 5) has been completed. In another embodiment, a timer with a timeout value is set where the timeout value is associated with the amount of time required to perform the system action. At the expiration of the timer, the maintenance mode lock is released and virtualization manager 330 is notified as described above. The timeout value may be set by an administrator for each type of system action, set to a default value, calculated in real-time, estimated according to previous times to perform similar system actions, or any other criteria known to one of ordinary skill in the art. The timer may be implemented in firmware, hardware, software or any combination thereof.

Once a maintenance lock is available, the requestor is notified at step 402. The requestor may be notified automatically through an event such as an SNMP trap, web service call, WS Man inform, or by any other notification known to one of ordinary skill in the art. At step 404, once it is determined that a maintenance lock is available, an event is triggered at the information handling system 300 based, at least in part, on the system action. The event may be an interrupt, the result of polling, the elapse of a hardware/software timer or any other software and/or hardware event known to one of ordinary skill in the art. The event may be triggered by remote access controller 360 which in turn notifies the server management tool 350, the virtualization manager 330 or any other device or component known to one of ordinary skill in the art that requests or is configured to receive notifications.

The event is then processed at step 406. For example, system management tool 350 handles the processing of the event where processing the event may include releasing or clearing of memory, clearing any associated interrupt(s), resetting of timer(s), clearing of flags or other semaphores, or any other known processing for handling a triggered event. In one example embodiment, a maintenance mode lock associated with one or more attributes of the maintenance mode of hypervisor 340 associated with the event is acquired by virtualization manager 330 prior to placing hypervisor 340 in maintenance mode. The maintenance mode lock may be implemented in firmware, hardware, software, or any combination thereof known to one of ordinary skill in the art.

After processing the event at step 406, it is determined at step 430 if the event was triggered by the remote access controller 360 via an IPMI option. If the event was triggered via an IPMI option, then at step 432 the hypervisor 340 is notified of the maintenance mode request via an IPMI extension.

Next, in step 434, the virtualization manager associated with the hypervisor 340 is notified of the status of the hypervisor 340. The hypervisor 340 is placed in maintenance mode prior to handling the system action request at step 440. In one example embodiment, the hypervisor 340 is placed in maintenance mode prior to notifying the virtualization manager at step 434. In another example embodiment, the hypervisor 340 is placed in maintenance mode after step 434. In one embodiment, the server management tool 350 may use an IPMI channel to place the hypervisor 340 in maintenance mode by using an IPMI extension that supports maintenance mode. In another embodiment, the server management tool 350 or the remote access controller 360 may communicate via network 210 using WSMAN, Webservice, or any other supported communication protocol to the virtualization manager 330 to request that the virtualization manager 330 place the hypervisor 340 in maintenance mode. The system management tool 350 may maintain maintenance mode attributes associated with the maintenance mode generally or with respect to the particular information handling system 220. In another example embodiment, the hypervisor 340 may perform one or more tasks associated with the event after the event is triggered. The tasks may be performed prior to or after the event is processed at step 406. For example, system variables may be stored in memory prior to processing the event.

At step 436, an IPMI option is not detected and virtualization manager 330 associated with hypervisor 340 is notified of the mode status change of hypervisor 340 from its current mode to maintenance mode. During step 436, the hypervisor 340 is placed in maintenance mode. Generally, one virtualization manager 330 is associated with hypervisor 340. In another embodiment, virtualization manager 330 may comprise one or more virtualization managers where any one or more of the virtualization managers may be associated with the hypervisor 340. In an example embodiment, one or more remote access consoles 310 request the mode status of information handling system 220 from virtualization manager 330. For example, in one embodiment an administrator at remote access console 310 requests the mode status of information handling system 220 from remote access controller 360 prior to initiating a request to install hardware updates on information handling system 220. Notification of the mode status change may include information related to any one or more of the previous mode, current mode (or mode changed to), type of system requesting the status change, type of system action requested, and other type of information associated with the mode status change. The virtualization manager 330 may store the mode status and any other information related to the mode status in a memory, including, but not limited to, RAM, ROM, NVRAM, hard disk, optical disk, and any other type of memory known to one of ordinary skill in the art including memory internal or external to virtualization manager 330.

At step 438, any tasks associated with the triggered event or any other required firmware, hardware, software task or any combination thereof is processed. Such tasks will not be discussed as part of this disclosure. Next, at step 440, the information handling system 220 processes the system action. The system action may require an upgrade or alteration to firmware, hardware, software, or any combination thereof. In one example embodiment, processing the system action may require allocating and deallocating memory. After processing of the system action, the virtualization manager 330 associated with each hypervisor 340 associated with any of the system actions may release the maintenance mode lock.

Figure 5:
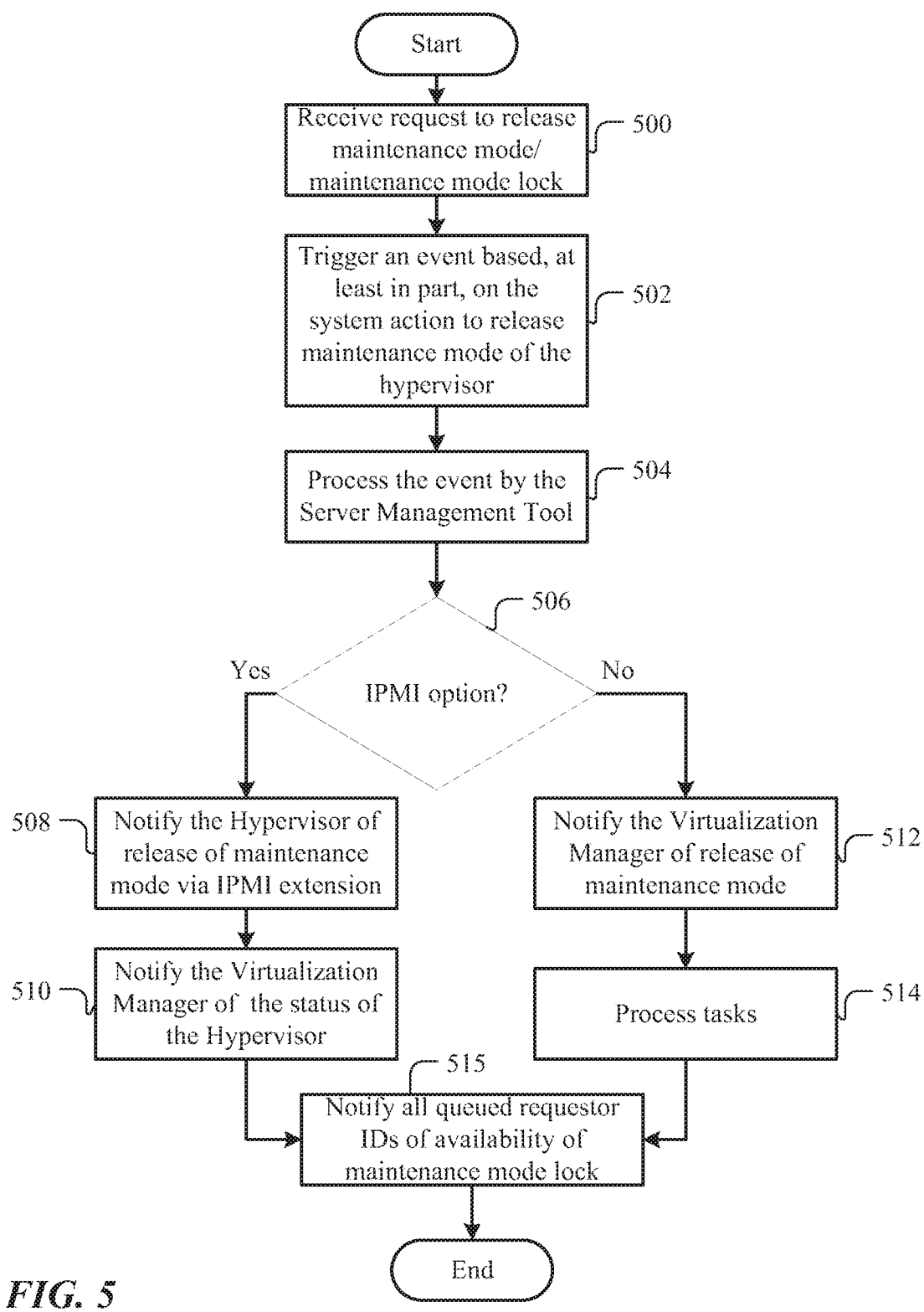
FIG. 5 illustrates a flow diagram of a method for providing release of maintenance mode from a virtualization aware server maintenance mode.

Turning to FIG. 5, illustrated is a flow diagram of a method for providing release of maintenance mode of a hypervisor, for example, hypervisor 340, from a virtualization aware server maintenance mode in an information handling system, such as information handling system or server 220. In one example embodiment, any number of hypervisors 340 may be associated with one or more requests, such as the request at step 500 for hypervisor 340 to be released from maintenance mode. Generally, hypervisor 340 is associated with one virtualization manager 330. In other embodiments, one or more virtualization managers 330 may be configured in a manner such that any one or more of the virtualization managers 330 is associated with a single hypervisor 340 or one or more hypervisors 340.

Next, at step 502, an event is triggered based, at least in part, on the request to release from maintenance mode hypervisor 340. The event is triggered in a similar manner to as that discussed above with respect to step 404. The triggered event is then processed by server management tool 350 at step 504. The triggered event is processed at step 504 in a manner similar to processing the triggered event discussed above with respect to step 406.

It is then determined, at step 506, whether the event was triggered via an IPMI option. If the event was triggered via an IPMI option, then at step 508, the hypervisor 340 is notified of release of maintenance mode via an IPMI extension similar to step 432 discussed above. The hypervisor 340 is release from maintenance mode and placed in any one of other modes supported by hypervisor 340. In one example embodiment, the hypervisor 340 is placed in the same mode prior to the hypervisor 340 being placed in maintenance mode. In another example embodiment, hypervisor 340 is placed in a mode according to the received system action. Once the hypervisor 340 is notified of the release of maintenance mode, the virtualization manager 330 is notified of the status of hypervisor 340 similar to step 434 discussed above.

If the event was not triggered via an IPMI option, then at step 512, the virtualization manager 330 of the release of maintenance mode of hypervisor 340 using standard interfaces. Such standard interfaces include WSMAN, Webservice, or any other standard interface known to one of ordinary skill in the art. During step 512, the hypervisor 340 is release from maintenance mode. At step 514, any tasks associated with the triggered event or any other required firmware, hardware, software task or any combination thereof is processed. Such tasks will not be discussed as part of this disclosure. At step 515, the requestor IDs queued in step 420 are notified of the availability of the maintenance mode lock using any known supported communication standard such as WSMAN or Webservices.

Although this disclosure has been described with respect to the operation of a console interface, a virtual machine interface and a management console interface within an information handling system, it should be recognized that the system and method described herein may be implemented with any similar interfaces. Consistent with this disclosure, for example, the information handling system 100 may be configured in such a manner as shown in FIG. 3 at 300. The information handling system 100, or networked configuration 300, may include an external or internal network depicted as network 210 in FIG. 2 and FIG. 3. The information handling system 100, or networked configuration 300, may be self-contained such that network 210 represents directly coupled bus(es).

The concepts disclosed herein should not be understood to be limited to the exemplary embodiments described, but should be understood to encompass all changes, substitutions, variations, alterations, and modifications to the example embodiments herein that a person having ordinary skill in the art would comprehend. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend.

What is claimed is:

1. An information handling system for managing a maintenance operation, comprising:
   a processor;
   a memory communicatively coupled to the processor, wherein one or more variables associated with the information handling system are stored in the memory;
   a hypervisor communicatively coupled to the processor;
   a server management tool coupled to the hypervisor;
   a user interface device, wherein the user interface device is coupled to the server management tool and to the hypervisor;
   a remote access controller coupled to the server management tool, wherein the remote access controller is operable to place the server management tool in a maintenance mode and wherein upon placing the server management tool in the maintenance mode, the server management tool is operable to place the hypervisor in maintenance mode, wherein when the hypervisor is in maintenance mode the hypervisor stops running and accepting requests and the hypervisor is configurable and alterable;
   one or more maintenance mode attributes associated with the maintenance mode, wherein the one or more maintenance mode attributes are maintained by the server management tool, and wherein the maintenance mode permits a maintenance operation to be performed on the information handling system, and wherein the maintenance operation comprises one of a firmware update and an upgrade;
   a network interface controller, wherein the network interface controller is operable to communicate with the remote access controller;
   a maintenance mode lock of the hypervisor, wherein the maintenance mode lock is operable to be set and released based, at least in part, on a system request, wherein the maintenance mode lock is associated with one or more attributes of the maintenance mode of the hypervisor, wherein the maintenance mode lock is acquired prior to placing the hypervisor in maintenance mode and wherein a virtualization manager is notified each time the maintenance mode lock is released; and
   a system action associated with the hypervisor, wherein the system action is queued based on at least one of a length of time to perform the system action, type of the system action, timestamp of receipt of the system action, and priority assigned to the system action, and wherein processing of the system action by the processor causes a requestor of the system action to be notified of at least one a status of the maintenance mode lock and mode status of the hypervisor.

2. The system of claim 1, further comprising:
   a remote access console coupled to the network interface controller, wherein the remote access console is operable to at least send a system request to the remote access controller.

3. The system of claim 1, further comprising:
   wherein the virtualization manager is coupled to the network interface controller, wherein the virtualization manager is operable to at least record information associated with one or more modes of the hypervisor and to send a system request to the remote access controller; and
   a remote virtualization memory, wherein the recorded information is stored in the remote virtualization memory.

4. The system of claim 3,
   wherein the maintenance mode lock is acquired by one of the user interface device, the virtualization manager, a remote access console coupled to the network interface controller, and the remote access controller, and wherein the maintenance mode lock is associated with one or more attributes of the maintenance mode of the hypervisor.

5. An information handling system for managing a maintenance operation, comprising:
   a processor; and
   a memory, wherein the memory includes executable instructions, that when executed, cause the processor to:
      receive a system action from a requestor, wherein the system action is associated with a hypervisor; and
      determine when a maintenance mode lock is available for the hypervisor, wherein:
         when the maintenance mode lock is available, then:
            receive a triggered event, wherein the event is based, at least in part, on the system action;
            process the event;
            place the hypervisor in maintenance mode, wherein the hypervisor is operable to be placed in one or more modes, wherein the one or more modes comprises the maintenance, and wherein the maintenance mode permits a maintenance operation to be performed on the information handling system, and wherein the maintenance operation comprises one of a firmware update and an upgrade, and wherein placing the hypervisor in maintenance mode comprises stopping the hypervisor from running and accepting requests and allowing the hypervisor to be configured and altered;
            set a timer with a timeout value, wherein the timeout value is associated with the amount of time required to perform the system action;
            notify a virtualization manager associated with the hypervisor of the mode status of the hypervisor;

queue the system action based on at least one of a length of time to perform the system action, type of the system action, timestamp of receipt of the system action, and priority assigned to the system action;
process the system action;
notify the requestor of the maintenance mode lock;
release the maintenance mode lock;
notify the virtualization manager associated with the hypervisor each time the maintenance mode lock is released; and
acquire the maintenance mode lock, wherein the maintenance mode lock is associated with one or more attributes of the maintenance mode of the hypervisor, and wherein the maintenance mode lock is acquired prior to placing the hypervisor in maintenance mode; and
notify the requestor that the maintenance mode lock has been acquired; and
when the maintenance mode lock is not available, then notify the requestor of the mode status of the hypervisor.

6. The system of claim 5, wherein the requestor is one of the user interface device, the remote access controller, the virtualization manager, and a remote access console, wherein the remote access console is coupled to the network interface controller.

7. The system of claim 5, wherein the executable instructions further cause the processor to:
request release of the maintenance mode lock from the requestor after expiration of the timer.

8. The system of claim 5, wherein the executable instructions further cause the processor to:
request that notification be sent to the virtualization manager each time the maintenance mode lock is released and each time the maintenance mode lock is acquired.

9. A method for managing virtualization server aware maintenance mode, comprising:
receiving a system action from a requestor, wherein the system action is associated with a hypervisor;
triggering an event from a remote access controller, wherein the triggered event is based, at least in part, on the received system action;
processing the event, wherein a server management tool manages the processing of the event;
placing the hypervisor in maintenance mode, wherein the hypervisor is operable to be placed in one or more modes, wherein the one or more modes comprises the maintenance mode, and wherein the maintenance mode permits performance of a maintenance operation, wherein the maintenance operation comprises one of a firmware update and an upgrade, and wherein placing they hypervisor in maintenance mode comprises stopping the hypervisor from running and accepting requests and allowing the hypervisor to be configured and altered;
notifying a virtualization manager associated with the hypervisor of the mode status of the hypervisor;
queuing the system action;
processing the system action;
notifying the requestor of the maintenance mode lock;
releasing the maintenance mode lock;
notifying the virtualization manager associated with the hypervisor each time the maintenance mode lock is released; and
acquire the maintenance mode lock, wherein the maintenance mode lock is associated with one or more attributes of the maintenance mode of the hypervisor, and wherein the maintenance mode lock is acquired prior to placing the hypervisor in maintenance mode; and
notify the requestor that the maintenance mode lock has been acquired.

10. The method of claim 9, wherein the requestor is one of a user interface device, the virtualization manager, a remote access console, and the remote access controller.

11. The method of claim 9, wherein the remote access controller instructs the virtualization manager to place the hypervisor in maintenance mode.

12. The method of claim 9, wherein the system action is queued based, at least in part, on at least one of a time to perform, a type, a timestamp, and an associated priority.

13. The method of claim 9, wherein the hypervisor is placed in management mode by a server management tool.

14. The method of claim 9, wherein the maintenance mode lock is released by the virtualization manager.

15. The method of claim 14, further comprising:
recording, by the virtualization manager, information associated with the one or more modes of the hypervisor; and
storing the information in a remote virtualization memory associated with the virtualization manager.

16. The method of claim 9, further comprising:
sending, by the virtualization manager, a system action request to the remote access controller; and
placing an information handling system associated with the hypervisor in maintenance mode based on the system action request.

17. The method of claim 9, wherein the notification is asynchronous.

* * * * *